Dec. 8, 1964
A. M. ANDREWS
3,160,687
METHOD AND APPARATUS FOR PRODUCING
PERFORATED SHEETING AND TUBES
Filed Nov. 19, 1962
2 Sheets-Sheet 2
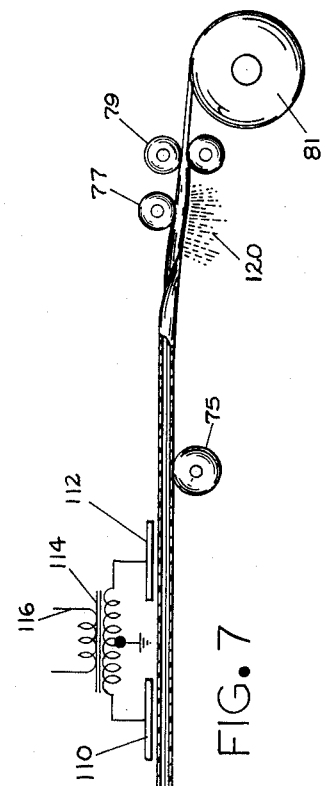
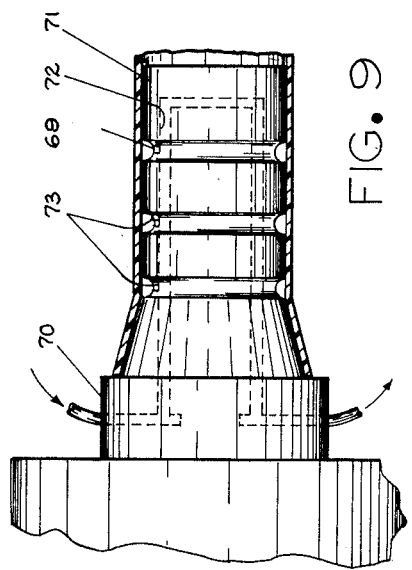
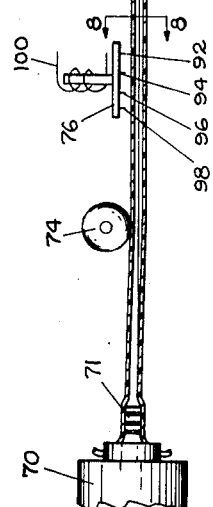
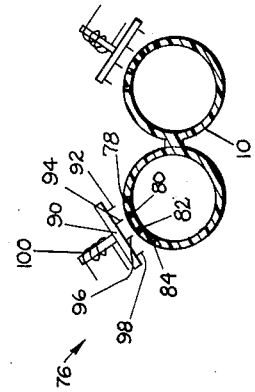
INVENTORS.
ALVADORE M. ANDREWS
BY
BUCKHORN, BLORE, KLARQUIST & SPARKMAN
ATTORNEYS

United States Patent Office 3,160,687
Patented Dec. 8, 1964

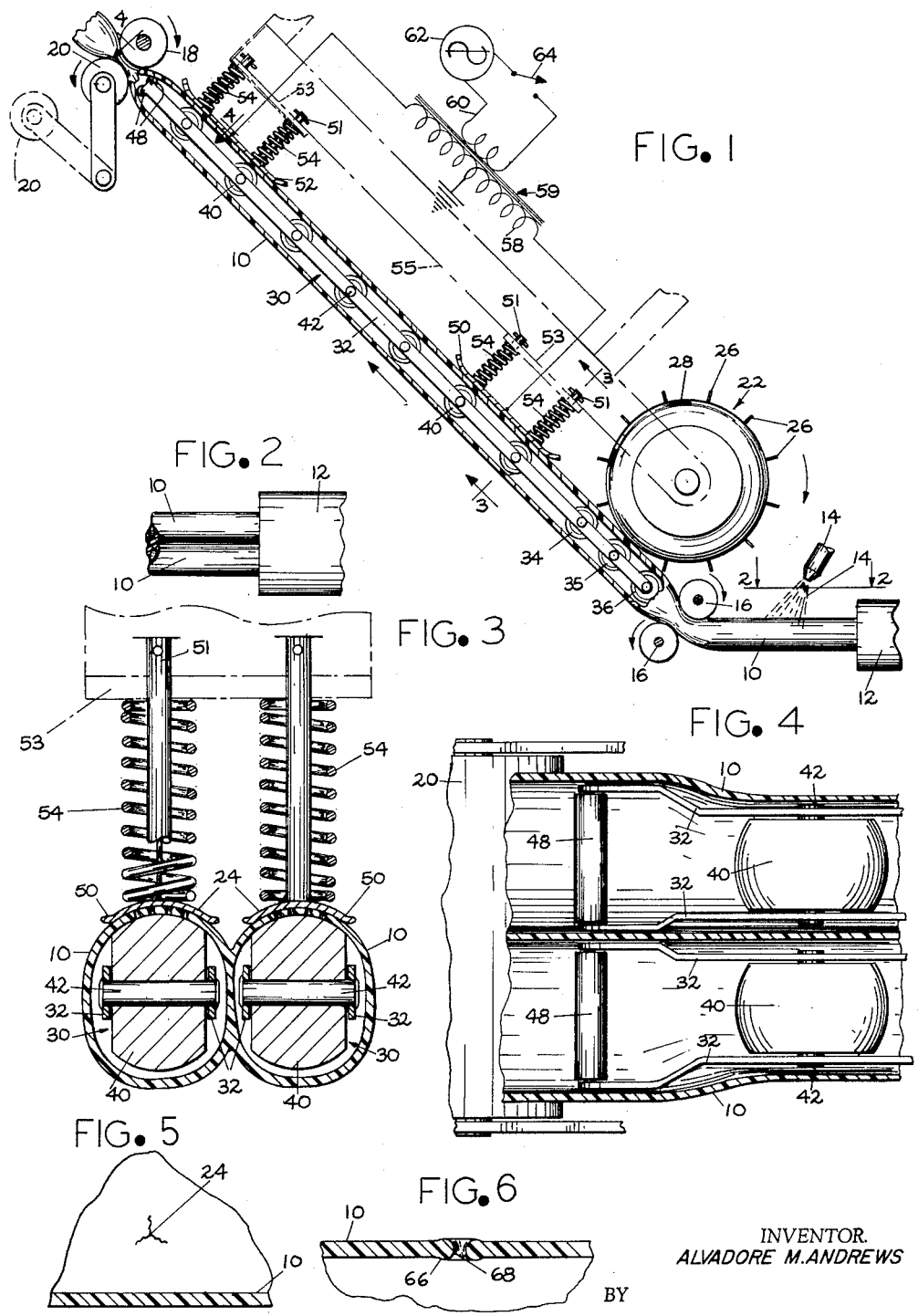

3,160,687
METHOD AND APPARATUS FOR PRODUCING
PERFORATED SHEETING AND TUBES
Alvadore M. Andrews, 8410 SW. Milton Lane,
Portland, Oreg.
Filed Nov. 19, 1962, Ser. No. 238,568
18 Claims. (Cl. 264—25)

This invention relates to a method of and an apparatus for making perforated plastic hoses, and more particularly to a method of and an apparatus for perforating tubular plastic hoses.

In the manufacture of perforated plastic hose for lawn irrigators or sprinklers, it is necessary to provide a multiplicity of small diameter perforations to the plastic material. It would be desirable to extrude plastic material in the form of a tubular hose and then form the perforations in the hose on one side only of the hose. To successfully form perforations in one side only of a hose extruded as a tube has been very difficult. One way that such hoses have been made has been to perforate a plastic sheet material, and then form the sheet material into a plastic tubing or hose with a seam with the edges of the plastic sheet bonded together. Such a method of forming perforated hose is disclosed and claimed in my Patent No. 2,683,208. This is a highly satisfactory method of forming perforated hose, but it would be desirable to extrude the plastic material into an unseamed tube and to form the perforations in the extruded tube.

An object of the invention is to provide new and improved methods and apparatus for making perforated plastic hose.

Another object of the invention is to provide a method and apparatus for sequentially extruding plastic material into tubular form and perforating the tubular plastic material at desired points therealong.

A further object of the invention is to provide a method and apparatus for continuously extruding plastic material into a tubular hose, advancing the hose along a predetermined path from the point of extrusion thereof and perforating the hose continuously at spaced points therealong in a portion of the path.

In a method and apparatus illustrating certain features of the invention, plastic hose may be extruded continuously, and the hose so extruded is advanced along a predetermined path along a portion of which it is pierced by a perforator to form rough, jagged holes therethrough. To form the rough, jagged holes into smooth orifices adapted to spray water in fine, non-diverging jets, a pair of spaced electrodes are positioned adjacent the exterior of the hose, and a potential difference is applied to the two electrodes. In the interior of the hose, the portions of the hose extending between the hose are bridged electrically so that current flows from one of the electrodes to the other through arcs through perforations adjacent the one electrode and back to the other electrode through arcs in the perforations adjacent the latter electrode. These arcs melt the plastic material adjacent the arcs and form the plastic material into smooth surfaced, somewhat beaded orifices.

A complete understanding of the invention may be obtained from the following detailed description of methods and apparatus forming specific embodiments thereof, when read in conjunction with the appended drawings, in which:

FIG. 1 is a fragmentary, partially sectional, side elevation view of an apparatus forming one embodiment of the invention;

FIG. 2 is a fragmentary, top plan view of the apparatus taken along line 2—2 of FIG. 1;

FIG. 3 is an enlarged vertical section of the apparatus taken along line 3—3 of FIG. 1;

FIG. 4 is an enlarged section of the apparatus taken along line 4—4 of FIG. 1;

FIG. 5 is an enlarged, fragmentary, perspective view of a portion of a sprinkler hose after it has been roughly perforated;

FIG. 6 is an enlarged, fragmentary section of a portion of a sprinkler hose showing a finished perforation therein;

FIG. 7 is a fragmentary, schematic, side elevation view of an apparatus forming an alternate embodiment of the invention;

FIG. 8 is a sectional view of a portion of the apparatus of FIG. 7 taken along line 8—8 of FIG. 7; and FIG. 9 is an enlarged view, partly in section, of a portion of the apparatus of FIG. 7.

Referring first to FIGS. 1 to 6, a pair of hoses 10 are extruded in integrally joined condition by a known extruder 12 from a vinyl plastic or similar plastic material which is of a dielectric strength substantially greater than that of air. The hot extruded hoses 10 are sprayed with cooling water from a spray head 14 as they travel continuously from the extruder 12 to pinch rollers 16. Pinch rollers 18 and 20 advance the tubes continuously from the rollers 16 in an upward direction relative to the rollers 16. The roller 18 is driven by suitable means (not shown) and the roller 20, which performs a backing function to keep the hoses in engagement with the roller 18, may be swung to its postiion shown in phantom in FIG. 1 for threading purposes. As the hoses 10 are advanced by the rollers 18 and 20 from the roller 16, the hoses are perforated by pins 26 projecting from the surface 28 of a perforating roll 22 to form rough or jagged perforations 24 (FIG. 5) in a predetermined pattern along the hoses 10. The peripheral speed of the roll 22 is the same as the linear speed of the hoses. The perforations 24 are spaced slightly around the peripheries of the hoses 10 from one another but are formed on one side only of each of the hoses 10.

Bridging cores or mandrels 30 (FIGS. 1 and 3) are inserted in each of the hoses 10 at the left-hand ends of the hoses just after the left-hand ends of the hoses 10 emerge from the pinch rollers 16, and float in the hoses between the rollers 16 and the rollers 18 and 20. The cores 30 comprise rigid, electro-conductive straps 32 between which are rotatably mounted supporting balls or rollers 34, 35 and 36 near the lower right-hand ends thereof. The cores stiffen the hoses and support the portions of the hoses 10 being pierced by the perforating pins 26. The rollers 34, 35 and 36 preferably are of rubber or plastic material so that if the perforating pins 26 enter the balls, no damage is done to the pins 26, and the rollers 34, 35 and 36 also have a high dielectric strength.

The straps 32 also rotatably support electro-conductive, truncated, spheroidal rollers 40, which are mounted and connected electrically to the straps 32 by metallic axles 42. To keep the cores 30 from turning in the hoses 10, each core is provided with a widened end portion, as illustrated in FIG. 4, to fit into the flattened portions of the hoses just before the hoses enter the pinch rollers 18 and 20 (FIG. 1). The straps 32 are bowed outwardly and support elongated spreading rollers 48. The diameter of each roller 48 is much less than the diameter of the rollers 40, and the length of each roller 48 is substantially greater than the normal diameter of each hose 10 to prevent, with the constricting action of the rollers 18 and 20, turning movement of the cores about their own longitudinal axes. The rollers 48 are individually rotatable and are spaced apart sufficiently relative to the separation of the rollers 18 and 20 that the rollers 18 and 20 block movement of the rollers 48 into the bite of the rollers 18 and 20.

Elongated electro-conductive shoes or electrodes 50 and 52 (FIGS. 1 and 3) are urged into engagement with spaced perforated portions of the hoses 10 by springs 54. The springs are supported by a fixed frame 55. The electrodes are mounted slidably on the frame 55 by rods 51 extending slidably in holes in plates 53. The electrodes press the upper portions of the hoses against the rollers 40, the portions of the hoses extending from the rollers 16 to the rollers 18 and 20 being kept under tension to hold the hoses in contact with the electrodes. Each electrode spans at least two of the rollers 40. The electrodes 50 and 52 are shaped along a radius equal to the radius of the exterior surface of each hose, and the rollers 40 have contacting surfaces formed on a radius equal to the radius of the interior surfaces of the hoses 10. The diameters of the rollers 40 are slightly less than the interior diameter of the hose 10 to permit rolling of the rollers on the axles 42, and the rollers 40 are held in engagement with the upper portions of the hoses by the rollers 36 and 48. A potential difference is applied across the electrodes 50 and 52 by a secondary winding 58 of transformer 59 having a primary winding 60 supplied with power from a power source 62 through a manually closed switch 64. The applied potential between the shoe-like electrodes 50 and 52 preferably is less than that which would cause breakdown of the hoses 10, but should be sufficient to cause arcing between the electrodes 50, 52 and the rollers adjacent thereto through the perforations 24 in the hoses 10. These arcs melt the jagged edges of the perforations 24, the surface tension of the melted material causing the perforations 24 to open up and form beaded rims 66 which define smooth surfaced orifices 68 in the hoses. Because of the smooth, continuous periphery of the orifices 68 and the absence of radial rips the application of stress to the material surrounding the opening will merely result in expansion of the opening. As will be apparent, the size of the orifices 68 can be controlled by varying the period of arcing and the voltage between the electrodes 50, 52. The melting of the tubing at the electrode 50 roughly smooths the perforations 24 and the melting at the electrodes 52 finishes or polishes the roughly smoother perforations.

The rollers 40 have as large a diameter as possible so that each point on the peripheral portions of the rollers is kept within arcing distance of the electrodes 50 and 52 as long as possible as the roller carrying that point is rotated. However, the diameter of the rollers 40 is sufficiently small that the bottoms of the rollers 40 do not appreciably engage the adjacent bottom portions of the hoses 10 so that the rollers 40 may roll freely. The cores 30 float in the hoses 10 and are biased by gravity toward the pinch rolls 16, which are spaced sufficiently close together as to prevent entrance of the roller 36 therebetween.

Another embodiment of the present invention is shown in FIGS. 7, 8 and 9. This embodiment comprises an extruder 70 adapted to extrude the hose 10 continuously, the extruder being provided with mandrels 71 over which the hoses are drawn as they emerge from the extruder. Tension is placed upon the emerging hoses by means to be described to cause the hoses to elongate or "drawdown" as they emerge from the extruder 70 with the plastic thereof still in its softened, unset stage. This will be recognized as customary procedure in the extrusion of plastic and effects a thinning of the tube walls because of the stretching action. As shown in FIG. 9, each of the mandrels 71 is provided with a passageway 72 through which cooling water or other electroconductive coolant may be circulated and each is also provided with a plurality of annular grooves 73 into which some of the coolant is bled by ducts 69. The water helps to cool the plastic below its setting temperature and also serves a further purpose to be described.

From the extruders 70 the hose is led slightly downwardly and beneath a roll 74, or other suitable guiding device, so as to provide a downward slope upon which the water bled into the grooves 73 may drain away from the mandrels 71.

From the roll 74 the hose sections 10 are led substantially horizontally and over a further roll 75. The hose sections are then led in a slightly downward path and are twisted so that the portion of the hose which previously was on top is next positioned beneath the hose and thereafter the hose sections are led beneath a further roller 77 and finally between a pair of draw rollers 79 which are driven so as to draw the hose sections from the extruder 70 and through the apparatus of the invention. From the draw rollers 79 the hose sections are led to a wind-up roll 81. The draw rollers 79 effect the tensioning or drawdown of the hose sections as they emerge from the extruder 70. Immediately after passing the wheel 74 the hose is led beneath a perforating apparatus 76. Referring to FIG. 8 for the moment, in the illustrated embodiment the tubes or hose sections 10 are each provided with a pattern of openings which are four in series including an opening 78 which is at the very top of the hose during spraying water therefrom, an opening 80 twenty-two and one-half degrees from the opening 78, an opening 82 forty-five degrees from the opening 78 and an opening 84 sixty-seven and one-half degrees from the opening 78. Such openings are preferably spaced about two inches apart longitudinally of the hoses. The perforating apparatus comprises a pair of plates 90 each having four needles 92, 94, 96 and 98 spaced laterally and longitudinally so as to pierce openings corresponding to openings 78, 80, 82 and 84, respectively, in each hose section. Suitable means which may comprise solenoids 100 are provided to reciprocate the plates 90 in timed relation with the passage of the hose sections 10 therebeneath so that the pattern of openings 78–84 is repeated continuously in the hose sections.

As shown in FIG. 8 the hose sections will maintain themselves in substantially rounded condition as they pass beneath the perforator and preferably the perforating apparatus is mounted so that the plates 90 reciprocate on a path inclined at approximately 34° from the vertical or along the line bisecting the angle between the openings 78, 84 of the corresponding section. As will be apparent, none of the piercing needles will be exactly radial in a stroke but by inclination of the stroke as indicated the "off radial angle" will be minimized. Since the wall sections need be only about 0.012 inch thick the openings pierced therethrough by the needles will not be particularly askew.

From the perforating apparatus 76 the hose sections 10 are passed beneath a pair of longitudinally spaced electrodes 110, 112 connected to the secondary of a transformer 114 having a primary winding 116 supplied with power from any suitable source. The transformer 114 is arranged to supply sufficient potential to the electrodes 110, 112 as to effect an arcing between the electrodes and the water within the hose sections beneath the same. Since the openings formed by the piercing needles 92–98 form weakened electrical paths the arcing will occur through such openings. These arcs will melt the jagged edges of the needle perforations whereupon the surface tension of the melted material will cause perforations to open up and form beaded rims as shown in FIG. 6 of the previous embodiment.

The slope which is maintained from the roller 75 to the roller 77 is sufficient so that the water in the hose sections between the rollers 74, 75 will substantially fill half of the hose sections, that is, does not rise above the mid-point. This is to prevent leakage of the water through the perforations formed by the needles 92–98, for it is desirable that the exterior of the hose sections be dry as they pass beneath the electrodes 110, 112. If the hose sections were wet upon their exterior this would, of course, form a conductive path between the electrodes and might prevent or at least weaken the arcing that would otherwise occur through the hose perforations to the water within the hose.

It will also be apparent that twisting of the hose so as to invert it and thus position the perforations 78–84 on the downward sides of the hose will provide drainage openings for the water within the hose. Such escaping water is indicated in the drawings at 120.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. The method of forming a perforated hose comprising
    continuously advancing the hose of dielectric material along a predetermined path having a perforated portion extending therealong,
    applying a potential difference to the perforated portion of the hose at points spaced along said path from one another,
    and electrically bridging internally of the hose from one of said points to the other of said points to create arcs in the perforations at said portions to melt and smooth the edges of the perforations in the hose.

2. The method of forming a perforated hose comprising
    continuously extruding a hose of dielectric material,
    continuously advancing the hose along a predetermined path,
    perforating the hose at one portion of the path,
    applying a potential difference to perforated portions of the hose spaced along the path from one another and from the portion of the path at which the hose is perforated,
    and electrically bridging the interior of the hose from one of said perforated portions to the other of said perforated portions to create arcs in the perforations at said portions to melt and smooth the edges of the perforations.

3. The method of perforating a strip of dielectric material comprising
    positioning a pair of electrodes in positions spaced from each other and overlying spaced, punctured portions of a strip of material with both electrodes on the same side of the strip,
    positioning an electro-conductive member on the other side of the strip adjacent punctured portions thereof to bridge the space between the electrodes,
    and applying a potential difference to the electrodes of sufficient magnitude as to draw arcs between the electrodes and the electro-conductive member.

4. The method of perforating a strip of dielectric material comprising
    applying an arcing potential difference to spaced punctured areas at one side of a strip of heat fusible material of which at least the portion adjacent said one side is of a dielectric strength greater than air,
    and bridging electrically between the punctured areas on the other side of the strip.

5. In a perforating apparatus,
    a pair of spaced electrodes adapted to overlie spaced punctured areas of a strip of dielectric material at the same side of the strip,
    electrically bridging means for engaging the other side of the strip and extending from one of the electrodes to the other,
    and means for applying a potential difference across the electrodes of sufficient magnitude to create arcing between the electrodes and the bridging means through the punctures in the strip to melt and smooth the peripheral portions of the punctures.

6. In a perforating apparatus,
    a pair of spaced electrodes adapted to overlie spaced punctured areas of a strip of dielectric material at the same side of the strip,
    means for advancing the strip of dielectric material past the electrodes,
    electrically bridging means extending from one of the electrodes to the other positioned at the other side of the strip,
    and means for applying a potential difference across the electrodes of sufficient magnitude to create arcing between the electrodes and the bridging means through the punctures in the strip to melt and smooth the peripheral portions of the punctures.

7. In a perforating apparatus,
    a pair of spaced electrodes adapted to engage spaced punctured areas of a strip of dielectric material at the same side of the strip,
    means for advancing the strip of dielectrc material past the electrodes,
    elongated electrically bridging means extending from one of the electrodes to the other for engaging the other side of the strip,
    and means for applying a potential difference across the electrodes of sufficient magnitude to create arcing between the electrodes and the bridging means through the punctures in the strip to melt and smooth the peripheral portions of the punctures.

8. The perforating apparatus of claim 7 wherein the bridging means comprises a plurality of electro-conductive rollers juxtaposed relative to the electrodes,
    and means for electrically connecting the rollers together.

9. In a perforating apparatus,
    means for advancing a hose of dielectric material along a predetermined path,
    means for puncturing at least one side wall of the hose repeatedly at one portion of the path,
    a pair of electrodes,
    means positioning the electrodes adjacent the exterior of the hose in positions spaced along the path of the punctured portions of the hose,
    electro-conductive mandrel means in the hose in a position extending from one electrode to the other electrode,
    and means for applying a potential difference to the electrodes of a magnitude sufficient to cause arcing between the electrodes and the mandrel through the punctures in the hose.

10. In an apparatus for making perforated tubing,
    means for continuously extruding tubing of dielectric material,
    a continuous puncturer for puncturing the tubing,
    means for advancing tubing so extruded continuously past the puncturer and upwardly from the puncturer,
    an elongated electro-conductive mandrel slidable in the tubing and extending along a portion of the tubing beyond the puncturer,
    a pair of electrodes in spaced positions adjacent punctured portions of the tubing and opposite to portions of the electro-conductive mandrel,
    and means for applying a potential difference to the electrodes of a magnitude sufficient to cause arcing between the electrodes and the mandrel to heat the edges of the punctures sufficiently to melt and smooth the edges.

11. In an apparatus for making perforated tubing,
    a pair of arcuate electrodes adapted to fit closely to the exterior of a tubing of dielectric material having punctures therein closely spaced at points therealong,
    means for advancing such a tubing along a predetermined path,
    means mounting the electrodes at one side of the path of the tubing in positions spaced from each other along the tubing and positioned closely adjacent punctured portions of the tubing, a plurality of electro-conductive rollers, electro-conductive strap means connecting the rollers and mounting the rollers in the tubing in positions opposite the electrodes, and means for applying a voltage across the electrodes of sufficient magnitude to draw arcs through the punctures in the portions of the tubing adjacent both the electrodes.

12. In an apparatus for making perforated hose, a puncturing wheel for puncturing hose, a pair of arcuate electrodes adapted to fit closely to the exterior of a hose of dielectric material having punctures therein closely spaced at points therealong, means for advancing such a hose past the puncturing wheel and along a predetermined path extending from the puncturing wheel, means mounting the electrodes at one side of the path of the hose in positions spaced from each other along the hose and positioned closely adjacent punctured portions of the hose, a plurality of electro-conductive rollers, electro-conductive means connecting the rollers and mounting the rollers in the hose in positions opposite the electrodes, means for applying a voltage across the electrodes of sufficient magnitude to draw arcs through the punctures in the portions of the hose adjacent both the electrodes, a backing roller of dielectric material, means linking the backing roller to the electro-conductive rollers and positioning the backing roller opposite to the puncturing wheel, and pinch means for constricting the hose to limit movement of the rollers relative to the electrodes.

13. In an apparatus for making perforated tubing, a pair of arcuate electrodes adapted to fit closely to the exterior of a tubing of dielectric material having punctures therein at points spaced closely therealong, means for advancing such a tubing along a predetermined path, means mounting the electrodes at one side of the path of the tubing in positions spaced from each other along the tubing and positioned closely adjacent punctured portions of the tubing, a plurality of electro-conductive rollers, electro-conductive means connecting the rollers and mounting the rollers in the tubing in positions opposite the electrodes, means for applying a voltage across the electrodes of sufficient magnitude to draw arcs through the punctures in the portions of the strip adjacent both the electrodes, a puncturing wheel, a backing roller of dielectric material, means linking the backing roller to the electro-conductive rollers, and a pair of pinch rollers for constricting the tubing sufficiently to prevent movement of the electro-conductive rollers past the pinch rollers.

14. In an apparatus for making perforated hoses, an extruder for extruding a pair of integral hoses of dielectric material continuously, a first pair of driven pinch rolls for advancing the hoses continuously from the extruder and for constricting the hoses, a second pair of driven pinch rolls movable together and apart between operative positions and retracted positions for constricting the hoses and advancing the hoses upwardly along a predetermined path from the first pair of pinch rolls, a puncturing wheel positioned along a first portion of the path for forming rough punctures in the hoses positioned along bands on the same side of the hoses, two pairs of elongated arcuate electrodes adapted to fit closely to the exteriors of the hoses, frame means mounting the electrodes at one side of the path of the hoses in positions spaced from each other along the hoses and positioned closely adjacent punctured portions of the hoses, a plurality of springs pressing the electrodes against the hoses, a plurality of electro-conductive rollers of a diameter slightly less than the interior diameter of the hoses, a plurality of backing rollers of dielectric material, two pairs of rigid electro-conductive straps connecting the rollers to form cores with the rollers, the cores being positioned floatingly in the hoses, the cores being of such a shape along the central portions thereof as to permit the portions of the hoses coextensive therewith to be circular and being wide and thin at the upper ends thereof to fit into flattened portions of the hoses approaching the second pair of pinch rolls, each of the cores including at the upper ends thereof a pair of elongated small diameter rollers spaced laterally from each other sufficiently to prevent entrance of the core into the bite of the pinch rolls, and means for applying an alternating current voltage across the electrodes of sufficient magnitude to draw arcs through the punctures in the portions of the strip adjacent both the electrodes.

15. The method of perforating a hose of dielectric material comprising positioning substantially level a portion of a hose of dielectric material having perforations only in the upper part thereof, applying a voltage across two spaced areas of the exterior upper part of said portion, and positioning an electro-conductive liquid in said portion of the hose to electrically bridge said spaced areas thereof in the interior of the hose so that current flows from one of said areas through the perforations in said areas, the liquid and the perforations in the other of said areas.

16. The method of making a perforated hose of dielectric material comprising continuously extruding a hose of dielectric material at a predetermined point, advancing the hose along a predetermined path first sloping downwardly from the point of extrusion and thence along a horizontal path, introducing a cooling electro-conductive liquid into the hose at said point of extrusion, roughly perforating only the top portion of the hose, and applying a voltage across two spaced areas of the top portion of the hose at points spaced along said horizontal path.

17. In an apparatus for perforating a hose, an extruder for extruding plastic material into a hose, means carried by the extruder for introducing electro-conductive cooling water into the interior of the hose as the hose leaves the extruder, a perforator for perforating roughly the top portion of the hose at a point beyond the nozzle means, means for guiding the hose first downwardly from the extruder and thence horizontally, a pair of electrodes mounted over the said horizontal path of said hose in longitudinally spaced relation, and means for applying a voltage across the electrodes to cause arcs through the perforations in the hose adjacent said electrodes.

18. In a perforating device, an extruder for extruding a pair of integrally joined tubes having a predetermined internal diameter, means for advancing tubes formed by the extruder along a predetermined path including a first path sloping downwardly from the extruder and therealong in a second path portion extending substantially horizontally, means in said extruder for introducing an electro-conductive liquid into said tubes whereby said liquid drains in said tubes downwardly to said second path portion, perforating means for forming rough perforations in the top portions of the tubes, a plurality of electrodes positioned over said horizontal path of said tubes, means for applying a voltage across said electrodes of a sufficient magnitude to cause arcing to the liquid in said tubes through the perforations in the top portions of the tubes under said electrode means to melt and smooth the portions of the tubes forming the peripheries of the perforations, and means for conducting said tubes in a second downward path from said horizontal path and for inverting said tubes whereby said liquid will drain from the portion of the tubes in said horizontal path to the portion in said second path and will drain from said tubes through the perforations therein.

References Cited in the file of this patent

UNITED STATES PATENTS

| | | |
|---|---|---|
| 2,388,069 | Meaker et al. | Oct. 20, 1945 |
| 2,550,366 | Meaker et al. | Apr. 24, 1951 |
| 2,683,208 | Andrews | July 6, 1954 |
| 2,763,759 | Sanai Mito et al. | Sept. 18, 1956 |
| 3,017,339 | Dewey | Jan. 16, 1962 |